UNITED STATES PATENT OFFICE.

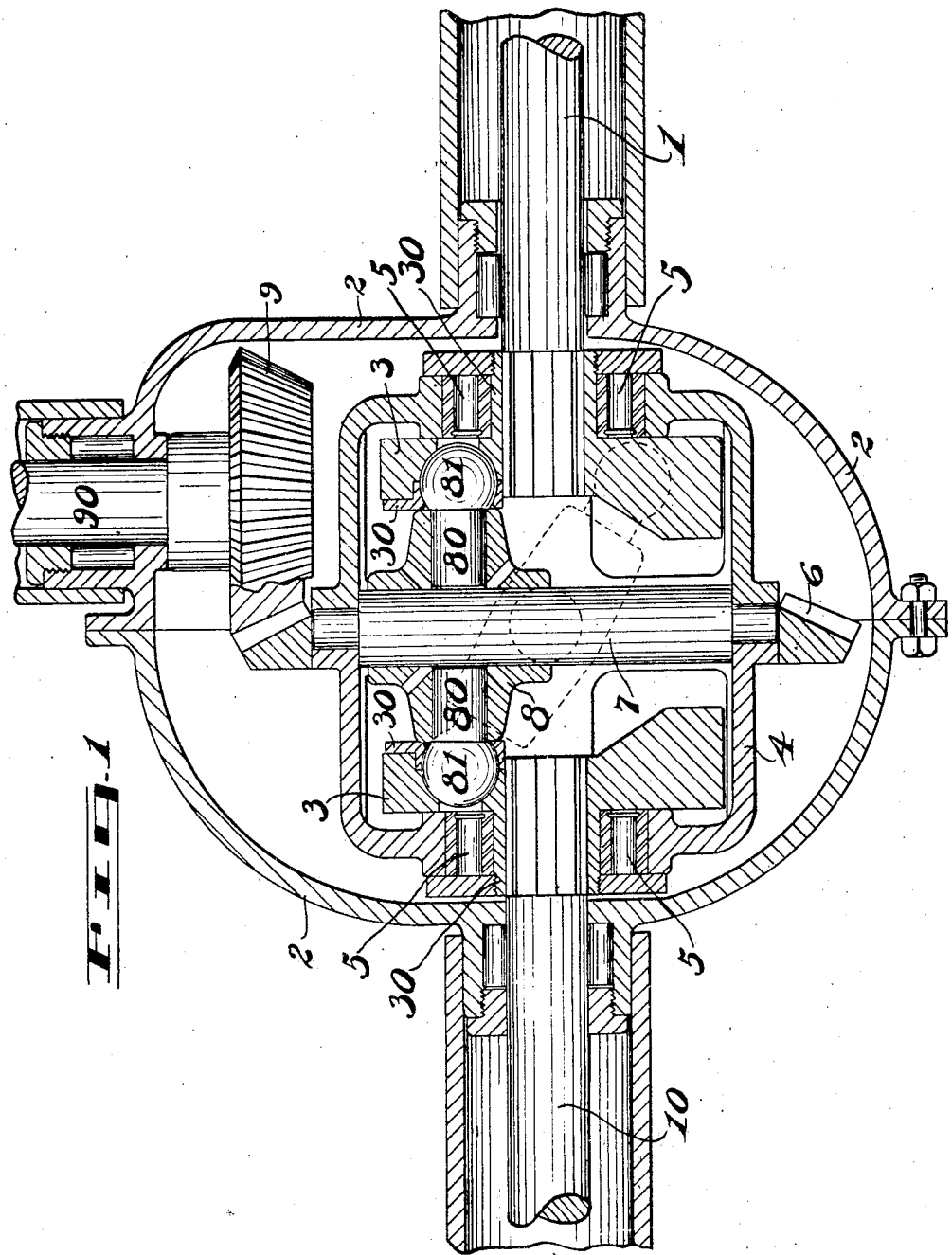

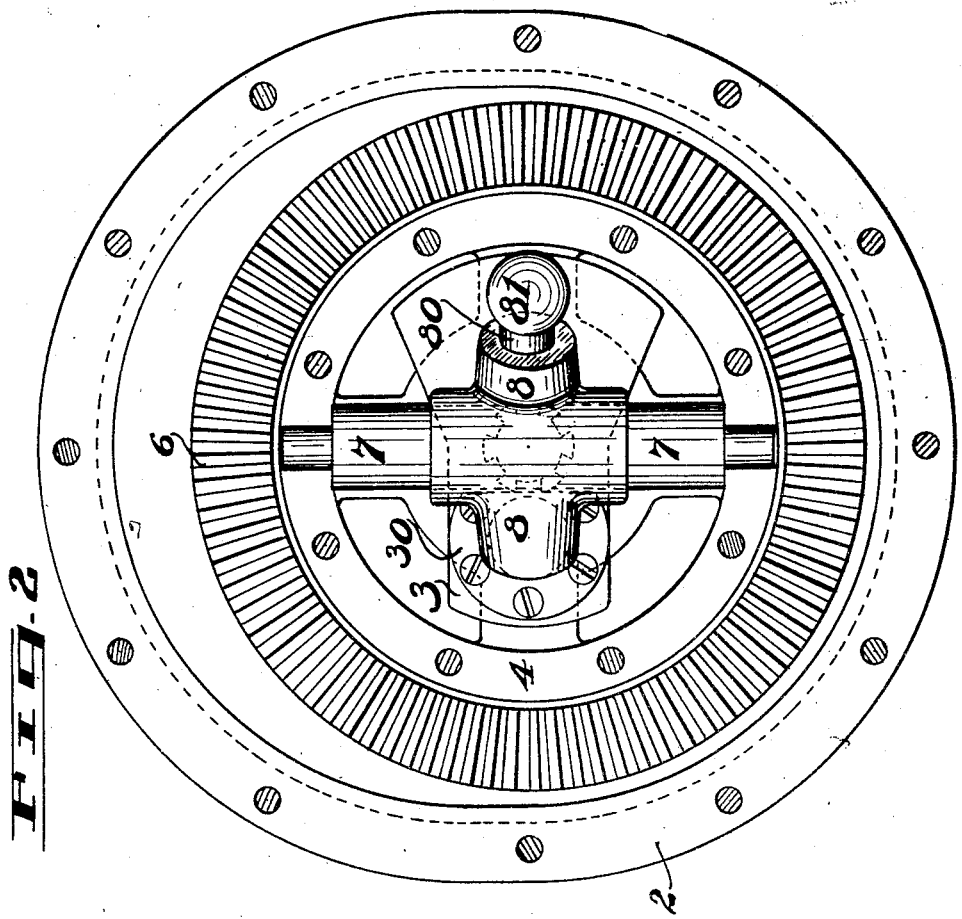

RALPH GERBER, OF RAYMOND, WASHINGTON.

DIFFERENTIAL GEARING.

1,364,745.  Specification of Letters Patent.  Patented Jan. 4, 1921.

Application filed March 25, 1920. Serial No. 368,514.

*To all whom it may concern:*

Be it known that I, RALPH GERBER, a citizen of the United States of America, and resident of the city of Raymond, in the county of Pacific and State of Washington, have invented certain new and useful Improvements in Differential Gearings, of which the following is a specification.

My invention relates to a differential designed for application in such situations as to connect the stub axles of the driving wheels of an automobile.

The object of my differential is, broadly speaking, the same as that of ordinary differentials, in so far as the connecting of two wheels with the source of power in such manner that power is applied to both wheels at the same time, so as to provide for difference in rotative speed of the two wheels.

The features of my invention which I believe to be new and upon which I desire to obtain a patent will be herein described and then particularly pointed out in the claims.

Figure 1 is a longitudinal section taken on a plane which passes through the stub axles and also through the driving shaft.

Fig. 2 is a transverse section taken just to one side of the master gear, being upon the plane of union between the two sides of the casing.

In the drawings 1 and 10 represent the two stub axles which it is desired to connect with the driving means through the intervention of a differential. These axles correspond to the rear axles of an automobile.

These axles are provided with rotative or journal bearings within a casing and the inner ends of each have secured thereto a crank arm 3, or an equivalent member. Journaled so as to turn about an axis coincident with the axis of the two stub shafts, is a frame 4 in which is mounted the parts of the differential.

I have herein shown each of the crank arms 3 as provided with a sleeve 30 upon which the frame 4 is mounted to turn. The bearing between these two parts is herein shown as consisting of a roller bearing of which the parts 5 represent the rollers. The casing 4 is thus free to turn about the same axis as that of the stub shafts 1 and 10, and yet independently thereof. To this frame is secured the master gear 6 or any other means by which power may be applied to the frame to turn it.

Journaled in the frame 4, extending in such direction as to be at right angles with and bisect the axis of the shafts 1 and 10, is a shaft 7. This shaft serves merely as a guide and fulcrum pin for a lever of variable length which is mounted to rock thereon and also to slide lengthwise thereof, said lever being connected with the two crank arms 3 in such manner as to transmit power between the two.

This lever is, as illustrated, of a compound construction consisting of a central hub section 8 and two short stubs ends 80 which telescope therewith. The outer ends of the short stub shafts 80 are provided with globular heads 81 which fit within sockets of similar shape formed in the crank arms 3. Removable plates, as 30, serve to hold the balls 81 each within its respective socket and to prevent removal therefrom. These parts form ball and socket joints so that the compound lever formed by the short shafts, or bars 80, and the socket piece 8, may turn at any angle with reference to the plane of rotation of the crank arms 3, within certain limits.

The master gear 6 is shown as driven from a pinion 9 which is secured to the power or driving shaft 90. It is evident that if the shaft 90 be turned, it will thus turn the master gear 6 and the latter, being secured to the frame, will turn said frame 4. If, now, the two shafts 1 and 10 be constrained in any manner so as to turn at exactly uniform and like speeds, the parts contained within the frame 4 will have no movement relative to each other but will be turned as a whole about the same axis as that of the shafts 1 and 10.

If, however, one of the shafts 1 or 10 be turned a little faster than the other, there will be a change in the relative position of the two crank arms 3. This means that the lever which connects the two, consisting of the central socket or fulcrum piece 8 and the two stub shafts 80, will rock upon the guide shaft 7 as a pivot. As the crank arms 3 shift so as to occupy different angular positions, the fulcrum member 8 of the connecting lever will move lengthwise upon said shaft 7. When the crank arms 3 assume positions 180° apart the casing 4 will have turned one half of this distance, or 90°. This will bring the shaft 7 into the position indicated by dotted lines in Fig. 1 and the lever which connects the two crank arms 3 will also assume the position shown by dotted lines in Fig. 1. In each and all of these positions the compound lever, consisting of the center piece 8 and the two shafts 80, will serve to transmit power in exactly like amounts to each of the stub shafts 1 and 10.

These parts being connected by smooth surfaces having sliding engagement with each other, will produce no noise by whatever changes in position occur therein. Instead of using bevel gears for connecting the power shaft 90 with the differential frame 4, any other type of construction may be employed, such for instance, as a worm and gear. In this manner the noise of operation may be reduced to such a point as to be wholly unobjectionable.

The casing may be supplied with lubricating oil, so that the parts operate in an oil bath and the wear will thereby be reduced to a minimum.

What I claim as my invention is:

A differential for connecting two alined shafts comprising a crank arm having a sleeve bearing keyed to each shaft, roller bearings upon said sleeve, a frame mounted upon said rollers and to turn about the common axis of the shafts, a driving gear secured to said frame, a fulcrum shaft extending across said frame transversely of and between the two alined shafts, a sleeve mounted to rock and to slide upon said fulcrum shaft and having two alined shaft-receiving sockets at opposite sides of the fulcrum shaft, stub shafts mounted in said sockets and having exterior ball ends, the crank arms having sockets for receiving said balls ends, and a removable plate mounted upon said crank arms to hold the exterior ball ends of the stub shafts in their respective sockets.

Signed at Raymond, Washington, this 18th day of March, 1920.

RALPH GERBER.